United States Patent
Tsuboi et al.

(10) Patent No.: US 8,796,971 B2
(45) Date of Patent: Aug. 5, 2014

(54) MOTOR DRIVE APPARATUS

(75) Inventors: Takashi Tsuboi, Okazaki (JP); Hiroyuki Kawata, Chiryu (JP); Yasuyoshi Toda, Toyohashi (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 13/462,873

(22) Filed: May 3, 2012

(65) Prior Publication Data

US 2012/0286712 A1 Nov. 15, 2012

(30) Foreign Application Priority Data

May 13, 2011 (JP) ................................. 2011-108802

(51) Int. Cl.
*H02P 6/14* (2006.01)
*B62D 5/04* (2006.01)
*H02K 11/00* (2006.01)

(52) U.S. Cl.
CPC .......... *H02K 11/0073* (2013.01); *B62D 5/0406* (2013.01)
USPC ............ 318/400.26; 318/400.27; 318/400.21; 310/71

(58) Field of Classification Search
USPC ........................... 318/400.26, 400.27, 400.21
See application file for complete search history.

(56) References Cited

U.S. PATENT DOCUMENTS

| | | | |
|---|---|---|---|
| 7,081,691 | B2 | 7/2006 | Kawata |
| 2003/0127921 | A1 | 7/2003 | Akutsu et al. |
| 2003/0200761 | A1 | 10/2003 | Funahashi et al. |
| 2003/0206392 | A1 | 11/2003 | Kawata |
| 2006/0075848 | A1 | 4/2006 | Suzuki et al. |
| 2008/0219867 | A1 | 9/2008 | Sakata |

FOREIGN PATENT DOCUMENTS

| | | |
|---|---|---|
| JP | 04-033558 | 2/1992 |
| JP | 10-234158 | 9/1998 |
| JP | 11-195678 | 7/1999 |
| JP | 2006-261100 | 9/2006 |
| JP | 3-884450 | 2/2007 |
| JP | 4-252486 | 4/2009 |
| WO | WO 2008/126715 | 10/2008 |
| WO | WO 2010/007672 | 1/2010 |
| WO | WO 2010/150530 | 12/2010 |

OTHER PUBLICATIONS

Office Action (14 pages) dated Jan. 24, 2014, issued in copending U.S. Appl. No. 13/462,862 of Uchida, filed May 3, 2012.
Office Action (2 pages) dated May 14, 2013, issued in corresponding Japanese Application No. 2011-108804 and English translation (2 pages).
Office Action (3 pages) dated Apr. 9, 2013, issued in corresponding Japanese Application No. 2011-108802 and English translation (4 pages).
Office Action (11 pages) dated Apr. 2, 2014, issued in copending U.S. Appl. No. 13/462,883 of Miyaki, filed May 3, 2012.
U.S. Appl. No. 13/462,862 of Uchida, filed May 3, 2012.
U.S. Appl. No. 13/462,883 of Miyaki, filed May 3, 2012.

*Primary Examiner* — Erick Glass
(74) *Attorney, Agent, or Firm* — Nixon & Vanderhye PC

(57) ABSTRACT

In a motor drive apparatus for driving a three-phase AC motor, a first mounting part of a heat sink is formed along an end. A second mounting part is formed in a direction perpendicular to the first mounting part and includes a first column part and a second column part. Three motor relay FETs are mounted on the first mounting part. Six inverter FETs and two power relay FETs are mounted on the second mounting part. Leads of the FETs are electrically connected to an electric circuit substrate. Heat generated by the FETs is radiated to the heat sink through an insulating and heat radiating sheet. By thus arranging the FETs, the motor drive apparatus is reduced in size.

11 Claims, 8 Drawing Sheets

COMPARATIVE EXAMPLE

MOTOR DRIVE APPARATUS

CROSS REFERENCE TO RELATED APPLICATION

This application is based on and incorporates herein by reference Japanese patent application No. 2011-108802 filed on May 13, 2011.

TECHNICAL FIELD

The present disclosure relates to a motor drive apparatus, which includes an inverter circuit and drives a multi-phase AC motor.

BACKGROUND

A conventional motor drive apparatus for driving a motor is used in an electric power steering system, for example, which assists a steering torque of a vehicle and the like by a rotation torque of a motor. In this motor drive apparatus, AC power is generated from a DC power source by an inverter and supplied to the motor.

For example, in an electric power steering system according to JP 3884450 (JP 2006-21645A), a motor relay, which shuts off power supply from an inverter to a three-phase AC motor, is formed of semiconductor switching elements. In case that three semiconductor switching elements are used as the motor relay in addition to six semiconductor switching elements of the inverter, the motor drive apparatus necessarily becomes large in size.

In case that a semiconductor switching element is provided further as a power supply relay between a DC power source and an inverter for shutting off a power supply circuit, a motor drive apparatus further becomes large in size.

SUMMARY

It is therefore an object to provide a motor drive apparatus, which includes an inverter and a motor relay formed of semiconductor switching elements and arranged in compact.

A motor drive apparatus is provided for driving a n-phase AC motor by converting a DC current to a n-phase AC current, with "n" being an integer equal to or greater than 3. The motor drive apparatus comprises 2n-units of inverter semiconductor switching elements, n-units of motor relay semiconductor switching elements, a heat sink, and an electric circuit substrate. The 2n-units of inverter semiconductor switching elements form high-side arms and low-side arms of an inverter circuit. The n-units of motor relay semiconductor switching elements are provided at an output side of the inverter circuit and capable of shutting off a current supply path to the motor. The heat sink mounts thereon the inverter semiconductor switching elements and the motor relay semiconductor switching elements and is capable of absorbing heat. The electric circuit substrate is connected with leads of the inverter semiconductor switching elements and the motor relay semiconductor switching elements. The heat sink has a first mounting part formed along one end thereof and a second mounting part formed perpendicularly to the first mounting part in a direction from the one end towards an other end opposite to the one end. The n-units of the motor relay semiconductor switching elements are mounted on the first mounting part of the heat sink. At least n-units of inverter semiconductor switching elements of the 2n-units of inverter semiconductor switching elements are mounted on the second mounting part of the heat sink.

BRIEF DESCRIPTION OF THE DRAWINGS

The above and other objects, features and advantages will become more apparent from the following detailed description made with reference to the accompanying drawings. In the drawings.

DESCRIPTION OF EMBODIMENT

A motor drive apparatus will be described in detail with reference to different embodiments shown in the accompanying drawings. In each embodiment, the motor drive apparatus is implemented in an electric power steering system, which assists a steering operation of a vehicle and uses a three-phase motor as an example of a multi-phase AC motor having n-units of phases ("n" is an integer equal to or greater than 3).

First Embodiment

Figure 1:
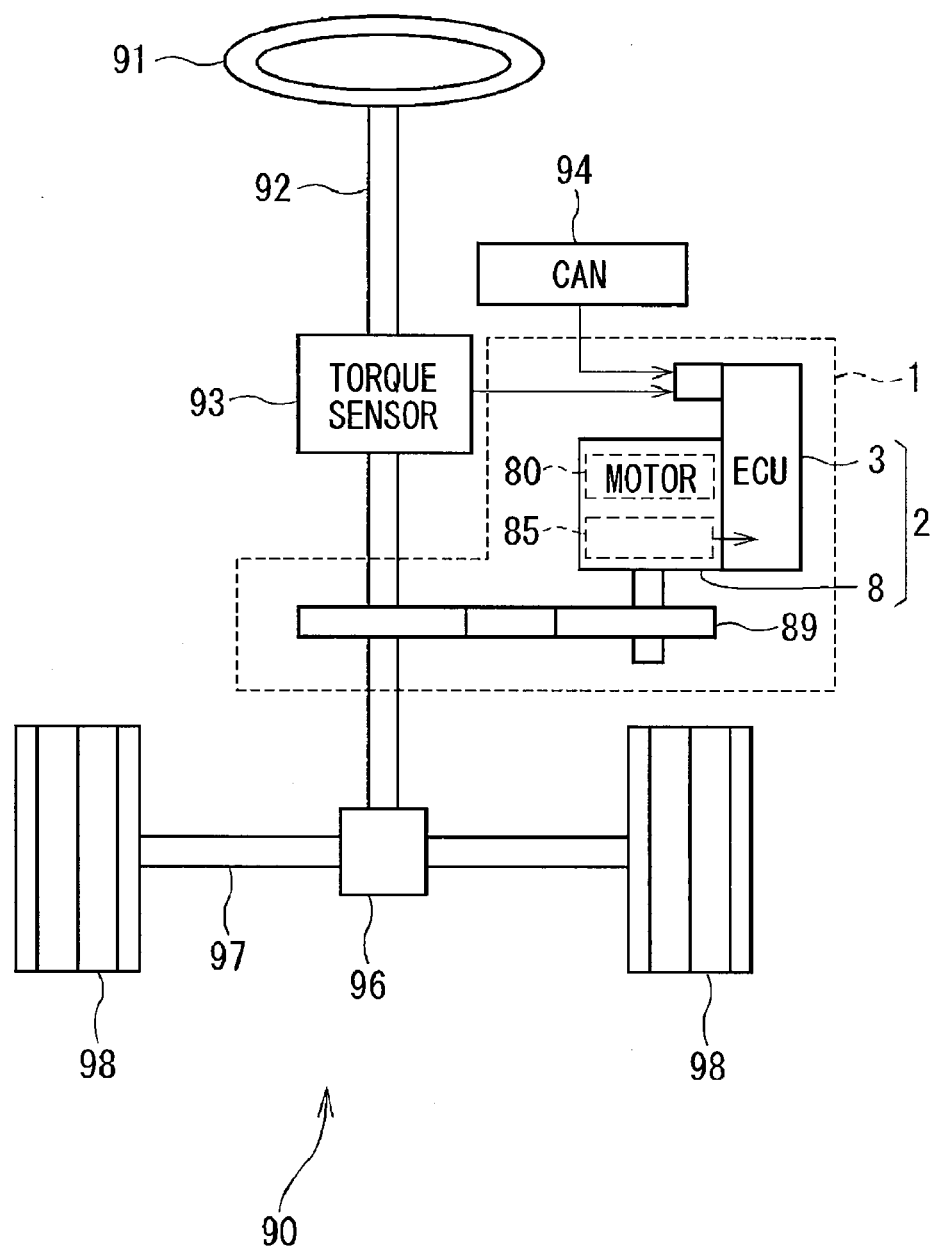
FIG. 1 is a schematic diagram of an electric power steering system to which a motor drive apparatus according to the first embodiment is applied.

As shown in FIG. 1, an electric power steering system 1 is provided in a power steering system of a vehicle to electrically assist a steering operation of a steering wheel 91. A torque sensor 93 is provided on a steering shaft 92 coupled to the steering wheel 91. The torque sensor 93 is for detecting a steering torque. A pinion gear 96 is provided at one longitudinal end of the steering shaft 92 and engaged with a rack shaft 97. A pair of tire wheels 98 is coupled rotatably to both ends of the rack shaft 97 through tie rods and the like. The rotary motion of the steering shaft 92 is converted to a linear motion of the rack shaft 97 by the pinion gear 96. The pair of tire wheels 98 is steered in correspondence to the linear motion of the rack shaft 97.

The electric power steering system 1 includes a motor unit 2 and a reduction gear 89. The motor unit 2 generates a steering assist torque. The reduction gear 89 reduces forward and reverse rotation of the motor unit 2 and transfers the rotation to the steering shaft 92. The electric power steering system 1 generates the steering assist torque and transfers the assist torque to the steering shaft 92 for assisting the steering of the steering wheel 91.

The motor unit 2 includes a motor assembly 8 and an electronic control unit (ECU) 3, which is a motor drive apparatus. The motor assembly 8 includes a motor 80 and a rotation angle sensor 85. The motor 80 is a three-phase brushless motor, which is formed of a stator, a rotor and the like. The stator is wound with coils. The rotor is rotatable in association with a rotating magnetic field generated by energization of the coils. The rotation angle sensor 85, which is for example a resolver, detects a rotation angle of the rotor. The ECU 3 is inputted with a steering torque signal outputted from the torque sensor 93, a vehicle speed signal of a controller area network (CAN) 94 and the like.

Figure 2:
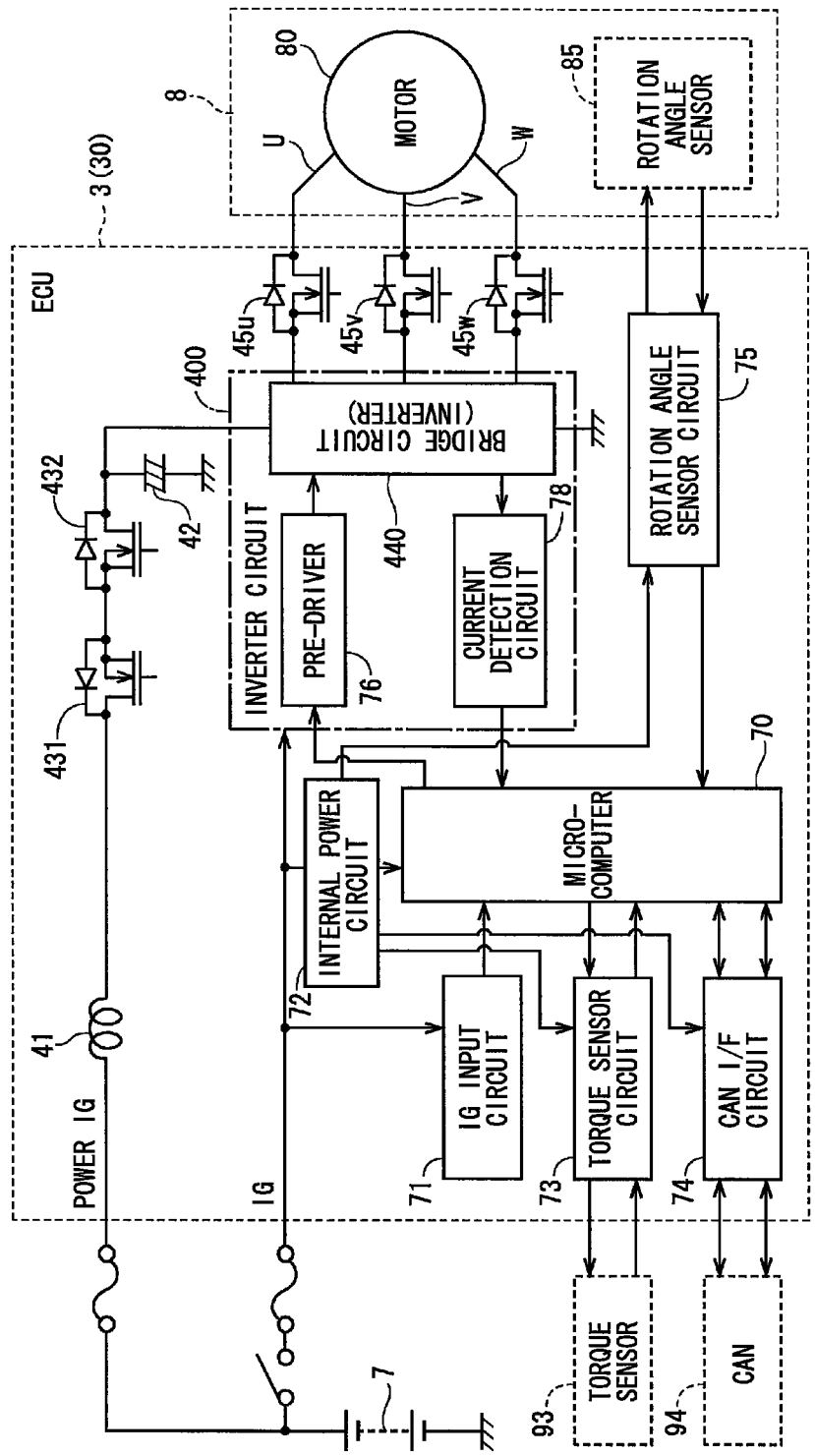
FIG. 2 is a circuit block diagram of the motor drive apparatus according to the first embodiment.

The ECU 3 is configured electrically as shown in FIG. 2. The ECU 3 is supplied with an electric drive power and a control power from a battery 7 through a power IG bus and an IG bus, respectively.

The power IG bus is provided with a choke coil 41, an electrolytic capacitor 42 and metal-oxide-semiconductor filed-effect transistors (FETs) 431, 432 as power supply relays. The choke coil 41 and the electrolytic capacitor 42 form a filter circuit to reduce noises transferred from other devices, which share the battery 7, and noises transferred from the ECU 3 to other devices.

The FETs 431, 432 are connected such that respective parasitic diodes are biased in opposite directions. The two FETs 431, 432 are collectively referred to as a power relay FET 43. The FETs 431, 432 are turned off by commands from a microcomputer 70 to protect a bridge circuit (inverter) 440, when the ECU 3 fails, for example. The FETs 431, 432 also shut off a current, which flows from the bridge circuit 440 to the motor 80.

The control power flowing through the IG bus is supplied to an inverter circuit 400 and also to the microcomputer 70 through an IG input circuit 71 and an internal power circuit 72. The microcomputer 70 controls the inverter circuit 400 in accordance with various input signals related to the steering assist torque. For example, the steering torque signal outputted by the torque sensor 93 is inputted through a torque sensor circuit 73, and the vehicle speed signal of the CAN 94 is inputted through a CAN interface circuit 74. The rotation angle signal outputted by the rotation angle sensor 85 in the motor assembly 8 is inputted through a rotation angle sensor circuit 75.

Figure 3:
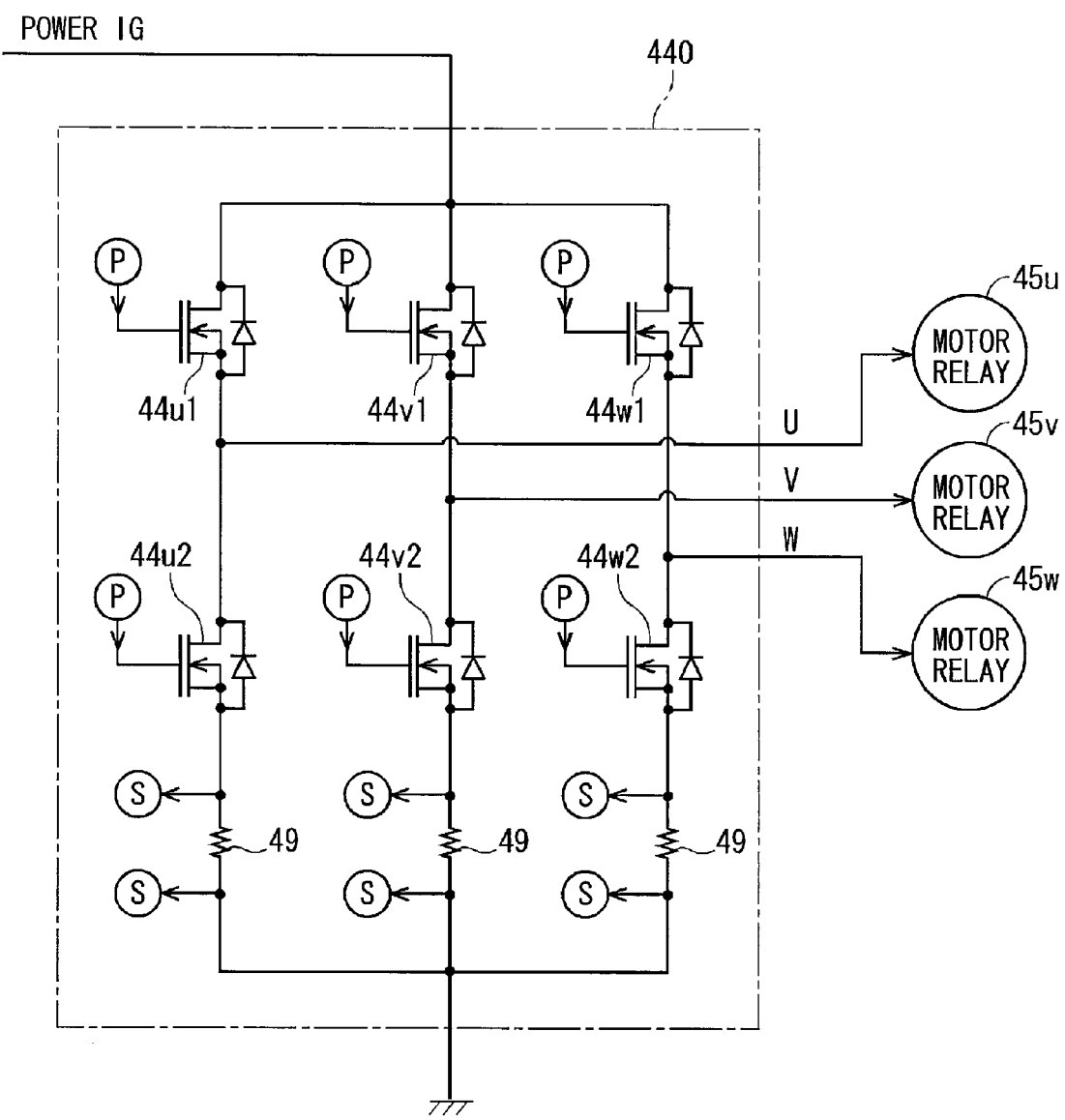
FIG. 3 is a schematic circuit diagram of an inverter used in the motor drive apparatus shown in FIG. 2.

The inverter circuit 400 includes, in addition to the bridge circuit 440 forming high-side and low-side arms of an inverter shown in FIG. 3, an inverter pre-driver 76 and a current detection circuit 78. In FIG. 3, "P" indicates a control signal from the inverter pre-driver 76 and "S" indicates an output signal to the current detection circuit 78.

As shown in FIG. 3, the bridge circuit 440 is formed of six FETs 44$u$1, 44$u$2, 44$v$1, 44$v$2, 44$w$1, 44$w$2 for an inverter and three shunt resistors 49. The FETs 44$u$1, 44$v$1, 44$w$1 are high-side arms, that is, high potential side semiconductor switching elements, of the U-phase, the V-phase, the W-phase, respectively. The FETs 44$u$2, 44$v$2, 44$w$2 are low-side arms, that is, low potential side semiconductor switching elements, of the U-phase, the V-phase, the W-phase, respectively. The three FETs for the high-side arms are referred to a FET 441, and the three FETs for the low-side arms are referred to as a FET 442. Further, the FETs 441, 442 for the high-side arm and the low-side arm are referred to as an inverter FET 44. The inverter FET 44 is a power relay semiconductor switching element.

The inverter pre-driver 76 changes the gate voltages of the FETs 441, 442 in response to commands from the microcomputer 70 thereby to switch over on-off state between the source and the drain of the FETs 441, 442. Thus, a motor terminal voltage, which is a voltage developed at a junction between the source of the FET 441 and the drain of the FET 442, is controlled.

The shunt resistor 49 is connected electrically between the FET 442 of the low-side and the ground. The current detection circuit 78 detects a current flowing through the shunt resistor 49 thereby to detect a current supplied to the motor coil of each phase, and feeds back the detected current to the microcomputer 70.

FETs 45$u$, 45$v$, 45$w$ are provided as motor relays in a current supply path of each phase from the bridge circuit 440 to the motor 80 thereby to shut off the current supply to the motor 80 in case of failure and the like. The three motor relay FETs are collectively referred to as a motor relay FET 45.

Figure 4:
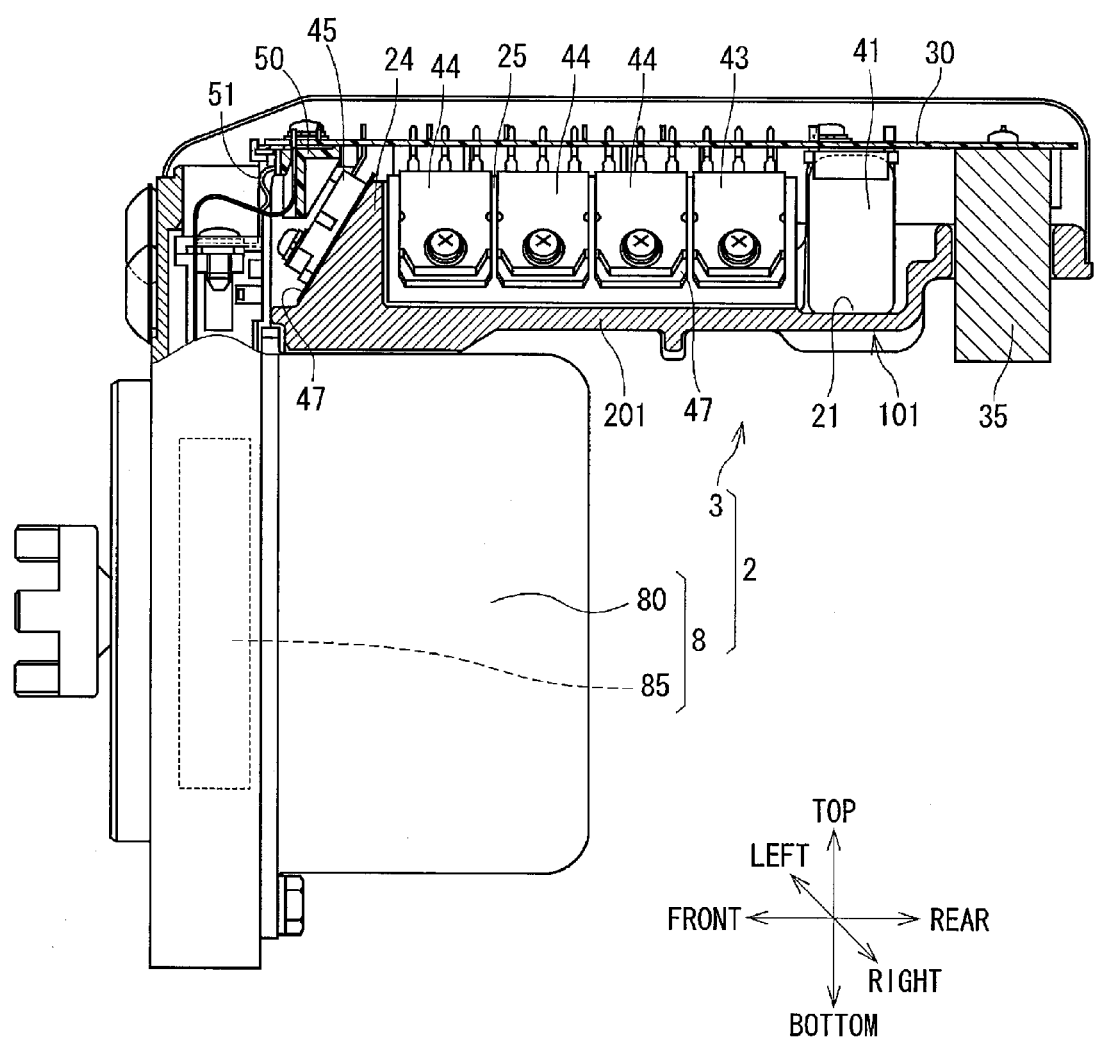
FIG. 4 is a sectional view of the motor drive apparatus assembled to a motor assembly.

The motor assembly 2 including the ECU 3 and the motor 80 is configured as shown in FIG. 4 to FIG. 7. The ECU 3 includes a heat sink 201, an electric circuit substrate (control and power substrate) 30 and a resin member 50. The heat sink 201 is a fixed part. Here, for convenience of description, the upper side and the lower side in FIG. 4 are assumed to correspond to the top side and the bottom side of the ECU 3, respectively. Further, the left side and the right side in FIG. 4 are assumed to correspond to the front side and the rear side of the ECU 3, respectively. Still further, the front surface side and the rear surface side of FIG. 4 are assumed to be the right side and the left side of the ECU 3, respectively.

As shown in FIG. 4, the ECU 3 is attached to the cylindrical outer peripheral wall of the motor 80 and generally in parallel to the axis of rotation of the motor assembly 8. The motor assembly 8 includes a brushless motor part 80 and a rotation angle sensor 85. The ECU 3 is formed of a plate sub-assembly 101, the electric circuit substrate 30, a connector 35 and the resin member 50. The plate sub-assembly 101 is a sub-assembly, in which the plurality of FETs 43, 44, 45 are mounted on the heat sink 201.

Electric leads of a total of eleven FETs 43, 44, 45 are connected to the electric circuit substrate 30, and the microcomputer 70 and the like for controlling on-off states of the FETs 43, 44, 45 are mounted on one substrate. The connector 35 is attached to the electric circuit substrate 30. The DC power source and a variety of signal wires are connected to the connector 35. The resin member 50 molds integrally three motor terminals 51, which connect the electric circuit substrate 30 and the motor 80.

The plate sub-assembly 101 will be described in detail with reference to FIGS. 5A, 5B and FIGS. 6A, 6B. The plate sub-assembly 101 is formed of the heat sink 201, the two power relay FETs 43, the six inverter FETs 44 and the three motor relay FETs 45. The total eleven FETs are mounted on the heat sink 201. The heat sink 201 is formed of a heat conductive material such as aluminum to have a function of accommodating heat generated by the FETs 43, 44, 45 and a function of a housing, which forms an outer peripheral configuration of the ECU 3.

Figure 5A:
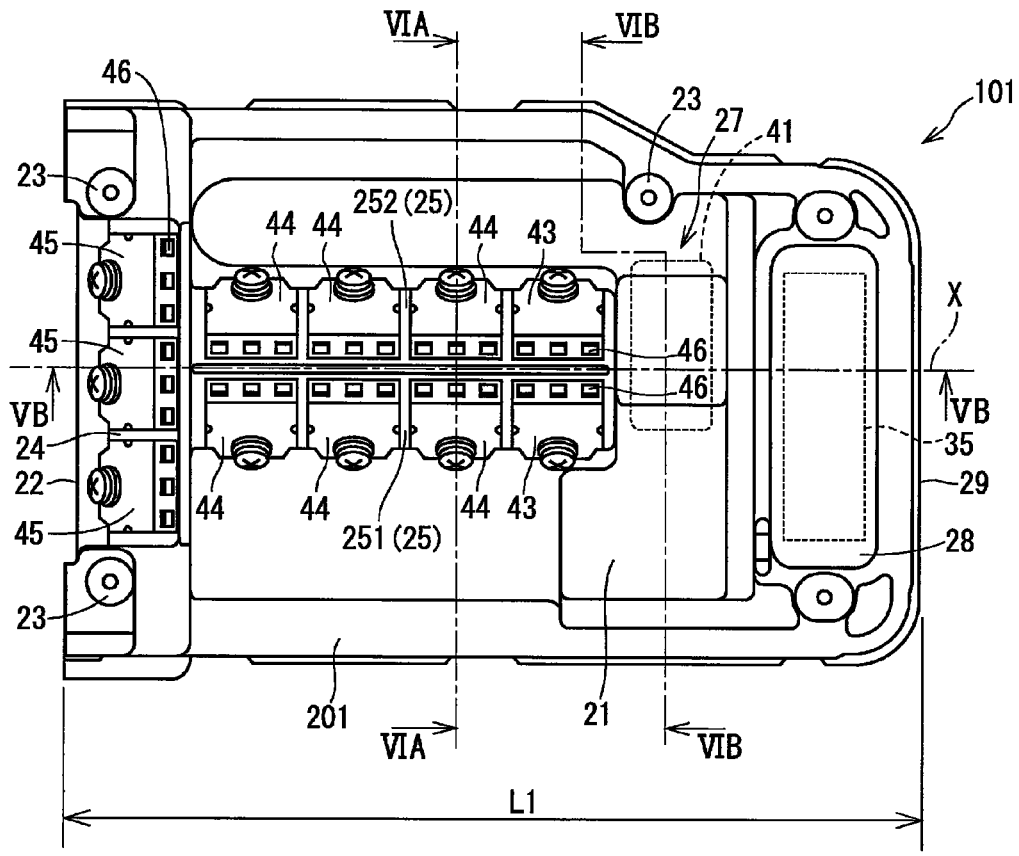
FIG. 5A is a plan view of the motor drive apparatus shown in FIG. 4.

As shown in FIG. 5A, the heat sink 201 is formed in generally a rectangular outer peripheral shape when viewed from the top side, that is, the electric circuit substrate 30 side. The rectangular shape has long sides in the axial direction of the assembly 8 (left-right direction in FIG. 5A) and short sides in the radial direction of the assembly 8 (up-down direction in FIG. 5A). The bottom face of the heat sink 201 provides a reference plane 21, which is generally parallel with the electric circuit substrate 30. In FIG. 5A, the left end of the heat sink 201 corresponds to an end 22 on the motor terminal 51 side and the right end of the heat sink 201 corresponds to an end 29 on the connector 35 side. The end 22 and the end 29 correspond to one end and the other end of the heat sink 201, respectively.

A plurality of columnar parts 23 is provided generally perpendicularly to the reference plane 21 of the heat sink 201. A screw hole is formed on the top of each columnar part 23 to fix the electric circuit substrate 30 to the heat sink 201. That is, the electric circuit substrate 30 is assembled to the upper side of the heat sink 201 as shown by a dotted line in FIG. 5B.

Figure 7:
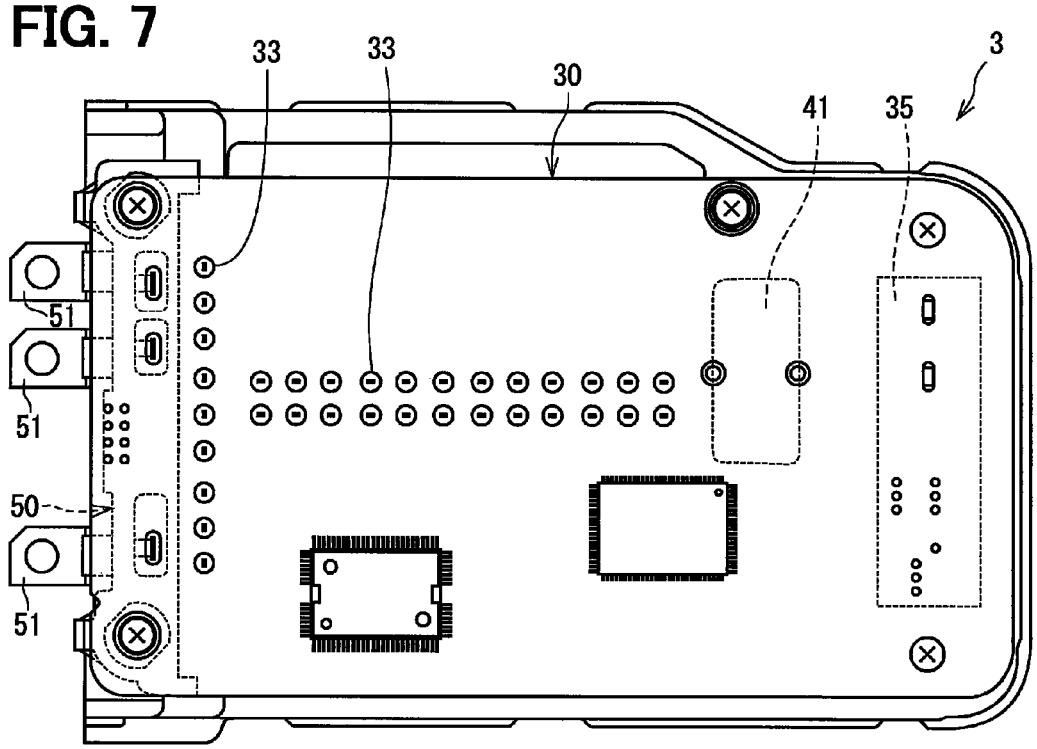
FIG. 7 is a plan view of a control and power substrate used in the motor drive apparatus according to the first embodiment.

The heat sink 201 has a first mounting part 24 at the end 22 side of the heat sink 201. The first mounting part 24 is formed to incline and rise from the end 22. The three motor relay FETs 45 are mounted on the first mounting part 24 through an insulating and heat radiating sheet 47. Each motor relay FET 45 has exposed electrodes on a surface, which faces and contacts the insulating and heat radiating sheet 47. The exposed electrodes tightly contact the insulating and heat radiating sheet 47 when the motor relay FETs 45 are thread-tightened by screws 48. Thus, not only the electric insulation between the motor relay FETs 45 and the heat sink 201 is secured, but also the heat generated by the motor relay FETs 45 is radiated to the heat sink 201 through the insulating and heat radiating sheet 47. Thus, failure and erroneous operation caused by temperature rise of the motor relay FET 45 can be prevented. Each lead 46 of the drain, the source and the gate of the motor relay FET 45 is bent generally perpendicularly relative to the reference plane 21 to be inserted into a corresponding one of through holes 33 of the electric circuit substrate 30 and soldered thereto as shown in FIG. 7.

Figure 5B:
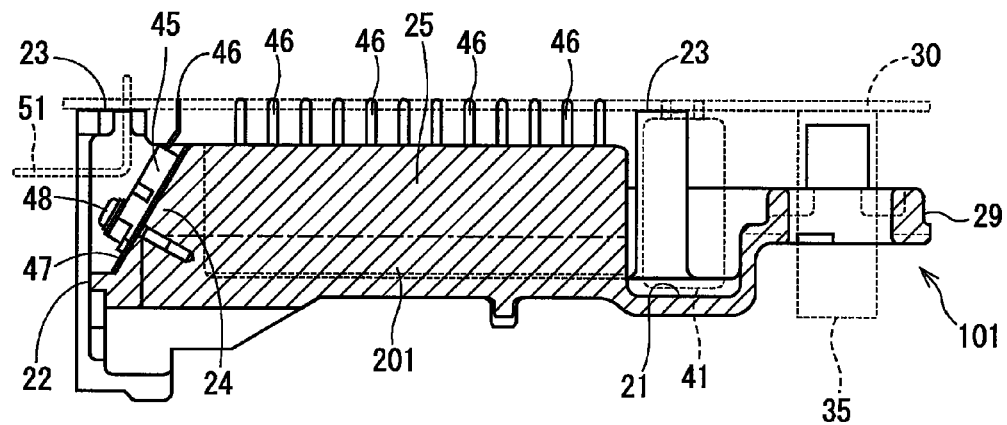
FIG. 5B is a side sectional view of the motor drive apparatus taken along a line VB-VB in FIG. 5A.
Figure 6A:
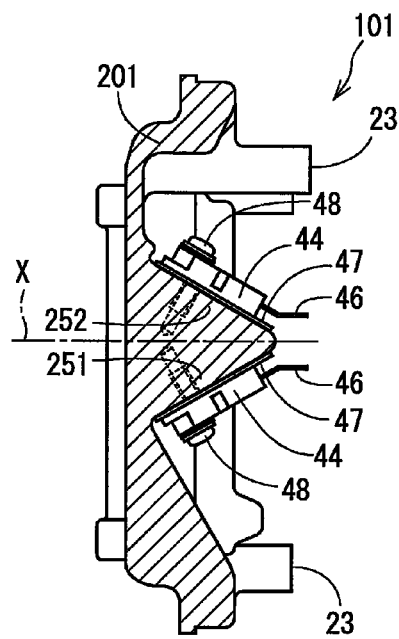
FIG. 6A is a sectional view of the motor drive apparatus taken along a line VIA-VIA in FIG. 5A.
Figure 6B:
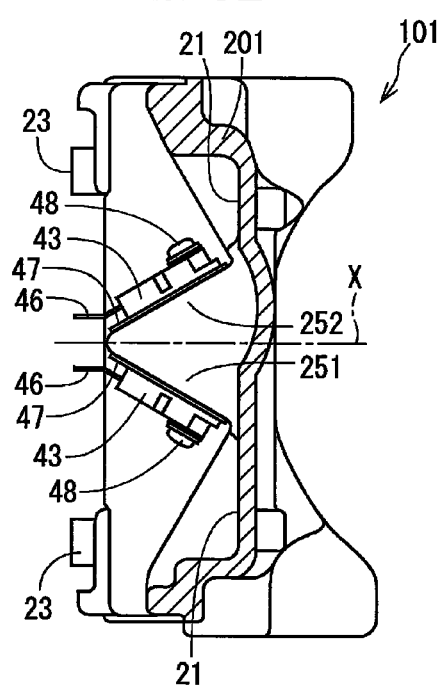
FIG. 6B is a sectional view of the motor drive apparatus taken along a line VIB-VIB in FIG. 5A.

As shown in FIG. 5B, each of the three motor terminals 51 for supplying the output current of the ECU 3 to each phase coil of the motor 80 is bent in a shape of letter L. Specifically, the motor terminal 51 extends downwards from the electric circuit substrate 30 at a position above the end 22, that is, extends towards the inclined surface of the first mounting part 24, and bends to extend away from the inclined surface of the first mounting part 24. The motor terminal 51 is positioned within a projection space of the motor relay FET 45 mounted on the first mounting part 24.

A second mounting part 25 is formed to extend generally perpendicularly relative to the first mounting part 24 and extend from the end 22 side towards the end 29 side. The second mounting part 25 thus extends in parallel to the axis of rotation of the motor 80. That is, the first mounting part 24 and the second mounting part 25 are arranged in a shape of letter T. The second mounting part 25 is formed of a first column part 251 and a second column part 252, which are two column parts parallel to each other. The first column part 251 and the second column part 252 of the second mounting part 25 are symmetrical each other relative to an axis of symmetry x, which is generally perpendicular to the first mounting part 24. The first column part 251 and the second column part 252 have respective inclined surfaces, which rise to approach the axis of symmetry x. That is, the second mounting part 25 has a mountain-like or triangular cross section.

The three inverter FETs 44 and one power relay FET 43 are mounted on each of the first column part 251 and the second column part 252 of the second mounting part 25 through insulating and a heat radiating sheet 47, respectively. The three inverter FETs 44 are mounted on the end 22 side of the first mounting part 24. The one power relay FET 43 is mounted on the opposite side to the end 22 side of the first mounting part 24, that is, closer to the end 29 side than the three inverter FETs 44 are. The three inverter FETs 44 and the one power relay FET 43 mounted on the first column part 251 and the second column part 252 of the second mounting part 25 are arranged closely such that leads of the FETs of the first column part 251 and the second column part 252 face each other.

Similarly to the motor relay FET 45, the inverter FET 44 and the power relay FET 43 are electrically insulated from the heat sink 201 and the heat generated by these FETs is radiated to the heat sink 201 through the insulating and heat radiating sheet 47.

Similarly to the motor relay FET 45, the leads of the FET 44 and the FET 43 are bent generally perpendicularly to the reference plane 21, inserted into the through holes 33 (FIG. 7) of the electric circuit substrate 30 and welded to the electric circuit substrate 30.

A connector insertion hole 28 is formed in the heat sink 201 at the end 29 side to insert the connector 35 therein. The connector 35 is formed in a generally rectangular parallelepiped or box shape. The connector 35 is attached to the electric circuit substrate 30 and connectable to a harness of the power bus from the battery 7, signal wires from the torque sensor 93 and the CAN network 94 and the like (FIG. 2). A choke coil accommodation part 27 for accommodating the choke coil 41 therein is formed in a space between the second mounting part 25 and the connector insertion hole 28 of the heat sink 201.

(Operation)

An operation of the ECU 3 according to the first embodiment will be described next.

The microcomputer 70 of the ECU 3 controls on-off states of the inverter FETs 44 through the pre-driver 6 of the inverter circuit 400 in accordance with the input signals of the steering torque, the vehicle speed and the motor rotation angle, the motor current detection signal and the like. The inverter circuit 400 converts the DC current supplied from the battery 7 through the power relay FET 43 into the three-phase AC current and supplies the AC current to the motor 80 of the motor assembly 8. The rotation output of the motor assembly 8 is transferred to the steering shaft 92 through the reduction gear 89 to assist a steering operation of a driver.

In case that the ECU 3 or the motor assembly 8 becomes abnormal, the microcomputer 70 protects the inverter circuit 400 by shutting off the motor relay FET 43 and shuts off the power supply to the motor 80 by turning off the motor relay FET 45 of each phase. The heat generated by on-off operations of the power relay FETs 43, the inverter FETs 44 and the motor relay FETs 45 is radiated to the heat sink 201 through the insulating and heat radiating sheet 47.

The ECU 3 of the first embodiment provides the following advantages (1) to (7).

Figure 9:
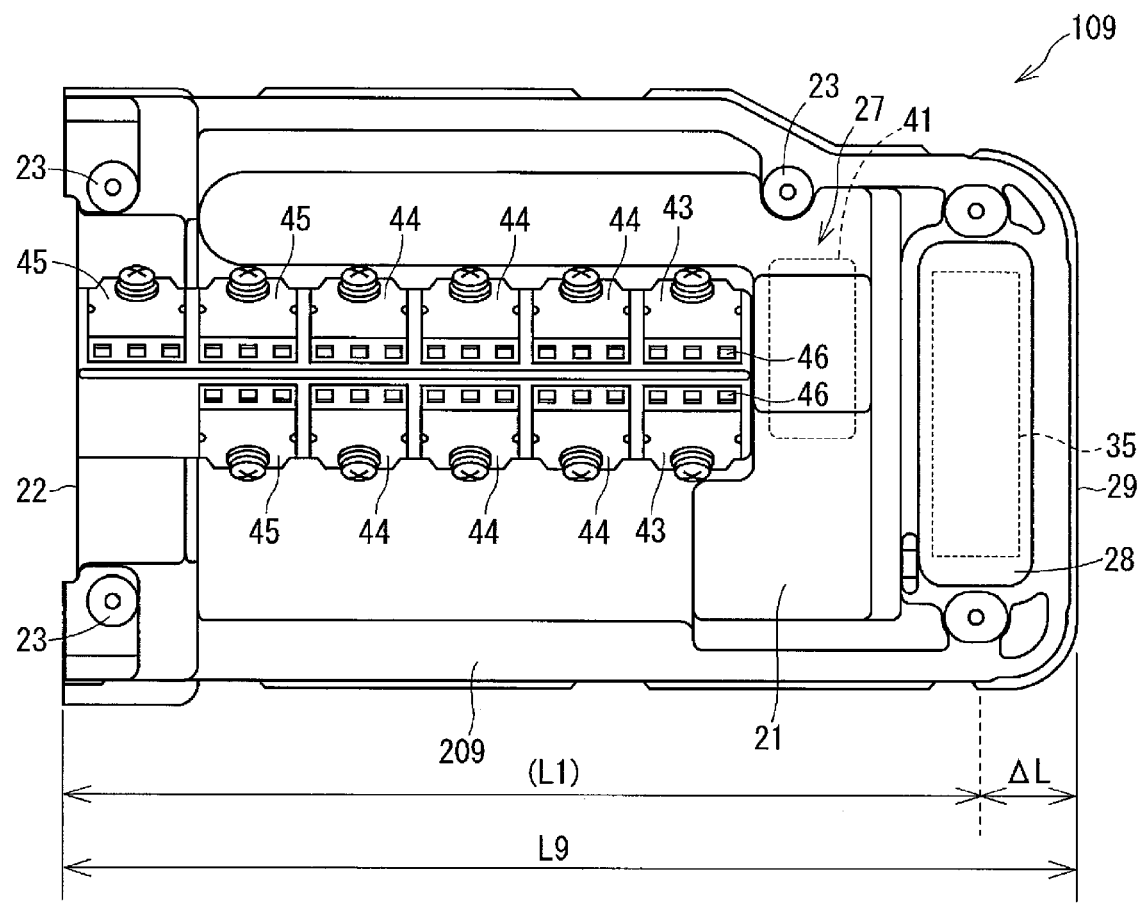
FIG. 9 is a plan view of a motor drive apparatus according to a comparative example.

(1) The heat sink 201 formed in generally the rectangular shape has the first mounting part 24 and the second mounting part 25, which are formed in the T-shape. The three motor relay FETs 45 are mounted on the part 24. A plate sub-assembly 109 according to a comparative example is exemplified in FIG. 9. In this comparative example, a heat sink 209 is not formed a mounting part, which extends along the short side and corresponds to the first mounting part 24 provided in the first embodiment. The eleven FETs 45, 44 and 43 are divided into a group of six and a group of five and mounted in two columns extending along the long sides of the heat sink 209. As a result, the length L9 in the longitudinal direction of the heat sink 209 is longer by a length ΔL than the length L1 in the longitudinal direction of the heat sink 201 of the first embodiment. Thus the size of the plate sub-assembly 109 is larger. That is, according to the first embodiment, the size of the plate sub-assembly 101 and hence the size of the ECU 3 can be made compact by forming the first mounting part 24 and the second mounting part 25 in the T-shape.

(2) The second mounting part 25 includes the first column part 251 and the second column part 252. The six inverter FETs 44 are dividedly mounted on the first column part 251 and the second column part 252, three on each column. Thus, the length in the longitudinal direction can be shortened and the six of the ECU 3 can be sized compact.

(3) The power relay FET 43 is mounted on the second mounting part 25 at the connector 35 side. In the direction from the connector 35 towards the motor terminals 51, the power relay FET 43, the inverter FET 44 and the motor relay FET 45 are positioned in this order. Thus the current is led to flow in only one direction on the electric circuit substrate 30 thereby to prevent stagnation of heat.

(4) The first mounting part 24 is inclined relative to the reference plane 21. The motor terminals 51 are provided in the space between the motor relay FET 45 mounted on the first mounting part 24 and the electric circuit substrate 30. As a result, the space is utilized efficiently and the size of the ECU 3 is reduced.

(5) The second mounting part 25 is also inclined relative to the reference plane 21. The choke coil 41 is disposed in the space (choke coil accommodation part 27) between the connector 35 and the second mounting part 25. As a result, the space is utilized efficiently and the size of the ECU 3 is reduced.

(6) The second mounting part 25 is formed in the shape of a mountain or triangle in cross section so that the leads between inverter FETs 44 mounted on the first column part 251 and the second column part 252 and the leads of the power FETs 43 are located closer. Thus, the wiring distance between the FET 43 and FET 44 is reduced and the wiring impedance is reduced. Thus loss of electric power is reduced.

(7) The power electronics parts such as the inverter FET 44 and the like and the control parts such as the microcomputer 70 and the like are mounted on one electric circuit substrate 30, which forms a control and power substrate 30. As a result, the size of the ECU 3 is reduced in comparison to the case, in which two substrates of a power substrate and a control substrate is small sized.

Second Embodiment

Figure 8A:
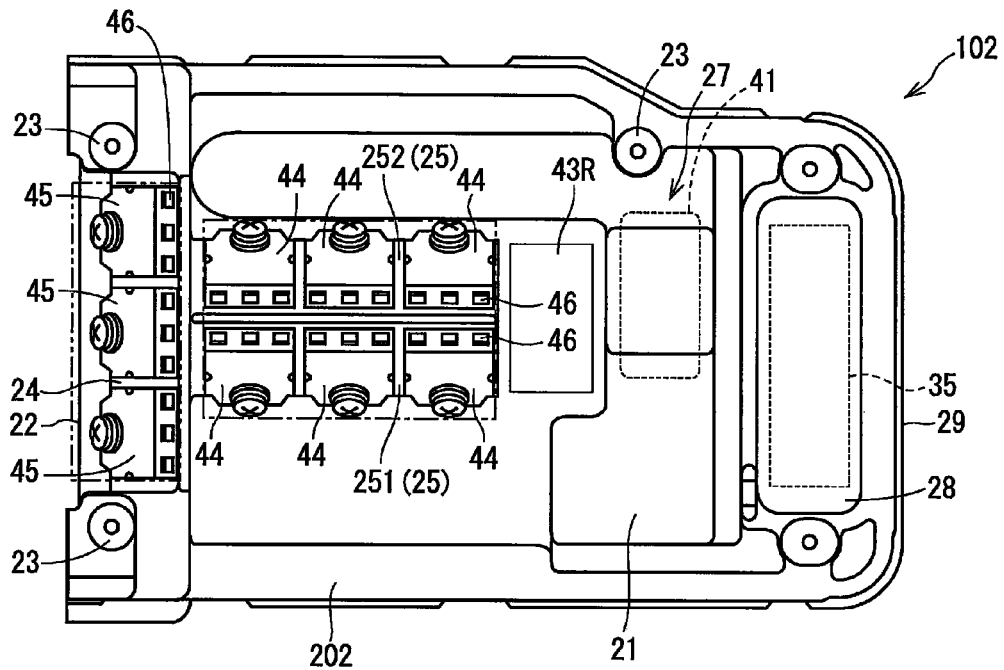
FIG. 8A is a plan view of a motor drive apparatus according to the second embodiment.

A motor drive apparatus according to the second embodiment will be described with reference to FIG. 8A. In the following embodiments, substantially same parts are designated by the same reference numerals as the first embodiment to simplify the description.

According to a plate sub-assembly 102 of the second embodiment, the six inverter FETs 44 are mounted on the second mounting part 25 of a heat sink 202. A mechanical power relay 43R is mounted at the connector 35 side of the second mounting part 25 in place of the motor relay FET 43. Thus the power relay may be a mechanical relay. The power relay 43R is disposed adjacently to the connector 35. As a result, the current flowing in the power IG bus on the electric circuit substrate 30 is led in one direction to prevent stagnation of the current.

Third Embodiment

Figure 8B:
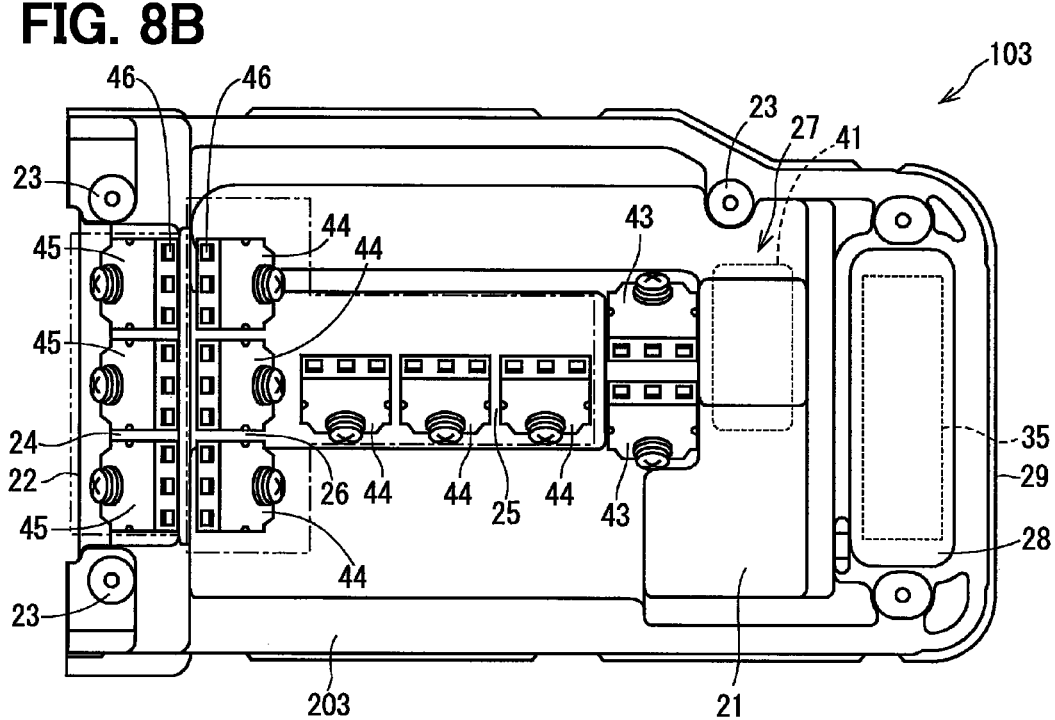
FIG. 8B is a plan view of a motor drive apparatus according to the third embodiment.

A motor drive apparatus according to the third embodiment will be described with reference to FIG. 8B.

According to a plate sub-assembly 103 of the third embodiment, the three motor relay FETs 45 are provided on the first mounting part 24 of a heat sink 203. Three of the six inverter FETs 44 are arranged in one row on the second mounting part 25. The two power relay FETs 43 are arranged on the second mounting part 25 at the connector 35 side. A third mounting part 26 is formed between the first mounting part 24 and the second mounting part 25 in a generally symmetrical relation to the first mounting part 24 with respect to an axis extending along the short side. The three remaining inverter FETs 44 are mounted on the third mounting part 26.

The motor relay FET 45 mounted on the part 24 and the inverter FET 44 mounted on the third mounting part 26 are arranged closely so that the leads of the FETs 44 and 45 face each other. According to this embodiment, the wiring distances of the three inverter FETs 44, which are arranged closely to the motor relay FETs 45, to the FETs 45 are shortened thereby decreasing the wiring impedance. Thus electric power loss is reduced.

Other Embodiments (A) The motor drive apparatus is not limited to be applied to the three-phase motor but may be applied to a multi-phase AC motors of four or more phases.

(B) In case that the second mounting part has two columns of mounting parts inclined relative to the reference plane, the first column part and the second column part may be inclined in the same direction so that the cross section has a saw-tooth shape.

(C) In the above-described embodiments, the power electronics parts such as the inverter FET 44 and the like and the control electronics parts such as the microcomputer 70 and the like are mounted on one control and power substrate 30. As other embodiments, a power electronics substrate and a control electronics substrate may be provided separately for the power electronics parts and the control electronics parts, respectively.

(D) In the above-described embodiments, the FETs 43, 44, 45 have exposed electrodes on the sides, which are mounted on the heat sink 201 and the like, and the insulating and heat radiating sheet 47 is used for electric insulation from the heat sink 201 and the like. As other embodiments, an insulating adhesive or other insulating layer forming materials may be used in place of the insulating and heat radiating sheet. In case that fully-molded FETs having no exposed electrodes are used, the insulating and heat radiating sheet need not be used.

(E) The semiconductor switching element may be a field effect transistor other than a MOSFET, a bipolar transistor, an insulated-gate bipolar transistor (IGBT) or the like.

(F) In the above-described embodiments, the ECU is described as being applied to the electric power steering system for a vehicle. The motor drive apparatus may be applied to motors of other systems.

The above-described embodiments may be modified further as other embodiments.

What is claimed is:

1. A motor drive apparatus for driving a n-phase AC motor by converting a DC current to a n-phase AC current with "n" being an integer equal to or greater than 3, the motor drive apparatus comprising:

2n-units of inverter semiconductor switching elements forming high-side arms and low-side arms of an inverter circuit;

n-units of motor relay semiconductor switching elements provided at an output side of the inverter circuit and capable of shutting off a current supply path to the motor;

a heat sink mounting thereon the inverter semiconductor switching elements and the motor relay semiconductor switching elements and capable of absorbing heat; and an electric circuit substrate connected to leads of the inverter semiconductor switching elements and the motor relay semiconductor switching elements, wherein the heat sink has a first mounting part formed along one end thereof and a second mounting part formed perpendicularly to the first mounting part in a direction from the one end towards an other end opposite to the one end, wherein the n-units of the motor relay semiconductor switching elements are mounted on the first mounting part of the heat sink, and wherein at least n-units of inverter semiconductor switching elements of the 2n-units of inverter semiconductor switching elements are mounted on the second mounting part of the heat sink.

2. The motor drive apparatus according to claim 1, wherein:

the second mounting part of the heat sink has two parallel columnar mounting parts, on each of which n-units of inverter semiconductor switching elements of the 2n-units of the inverter semiconductor switching elements are mounted.

3. The motor drive apparatus according to claim 1, further comprising:

a power relay semiconductor switching element capable of shutting off the current supply path from the DC power source to the inverter circuit, wherein the power relay semiconductor switching element is mounted on the second mounting part at a side opposite to the first mounting part, and leads of the power relay semiconductor switching element are electrically connected to the electric circuit substrate.

4. The motor drive apparatus according to claim 1, wherein:

the first mounting part of the heat sink is formed to incline relative to a reference plane of the heat sink, the reference plane being parallel to the electric circuit substrate.

5. The motor drive apparatus according to claim 4, wherein:

motor terminals for connecting the electric circuit substrate and the motor are provided in a space between the motor relay semiconductor switching elements and the electric circuit substrate.

6. The motor drive apparatus according to claim 1, wherein:

the second mounting part of the heat sink is formed to incline relative to a reference plane of the heat sink, the reference plane being parallel to the electric circuit substrate.

7. The motor drive apparatus according to claim 6, wherein:

the second mounting part of the heat sink has two columnar mounting parts formed to incline relative to the reference plane so that the two columnar parts form a triangular shape in section.

8. The motor drive apparatus according to claim 6, further comprising:

a connector connected to the electric circuit substrate and provided near the other end of the heat sink to receive DC power; and a choke coil provided between the connector and the second mounting part and connected to a power supply side of the power relay semiconductor switching element to smooth noises.

9. The motor drive apparatus according to claim 1, further comprising:

control electronics elements provided on the electric circuit substrate for controlling driving of the motor.

10. The motor drive apparatus according to claim 1, wherein:

the heat sink is attached to a cylindrical outer peripheral wall of the motor; and the second mounting part extends in a direction parallel to an axis of rotation of the motor.

11. The motor drive apparatus according to claim 10, further comprising:

motor terminals provided in a space between the motor relay semiconductor switching elements and the electric circuit substrate for connecting the electric circuit substrate and the motor, wherein the first mounting part of the heat sink is formed to incline relative to a reference plane of the heat sink, the reference plane being parallel to the electric circuit substrate, wherein the second mounting part of the heat sink is formed to incline relative to the reference plane of the heat sink, and wherein the second mounting part of the heat sink has two parallel columnar mounting parts, on each of which n-units of inverter semiconductor switching elements of the 2n-units of the inverter semiconductor switching elements are mounted.

* * * * *